May 14, 1963 C. W. CROMER ETAL 3,089,245
COMBINATION TOOL
Filed Aug. 21, 1959 2 Sheets-Sheet 1
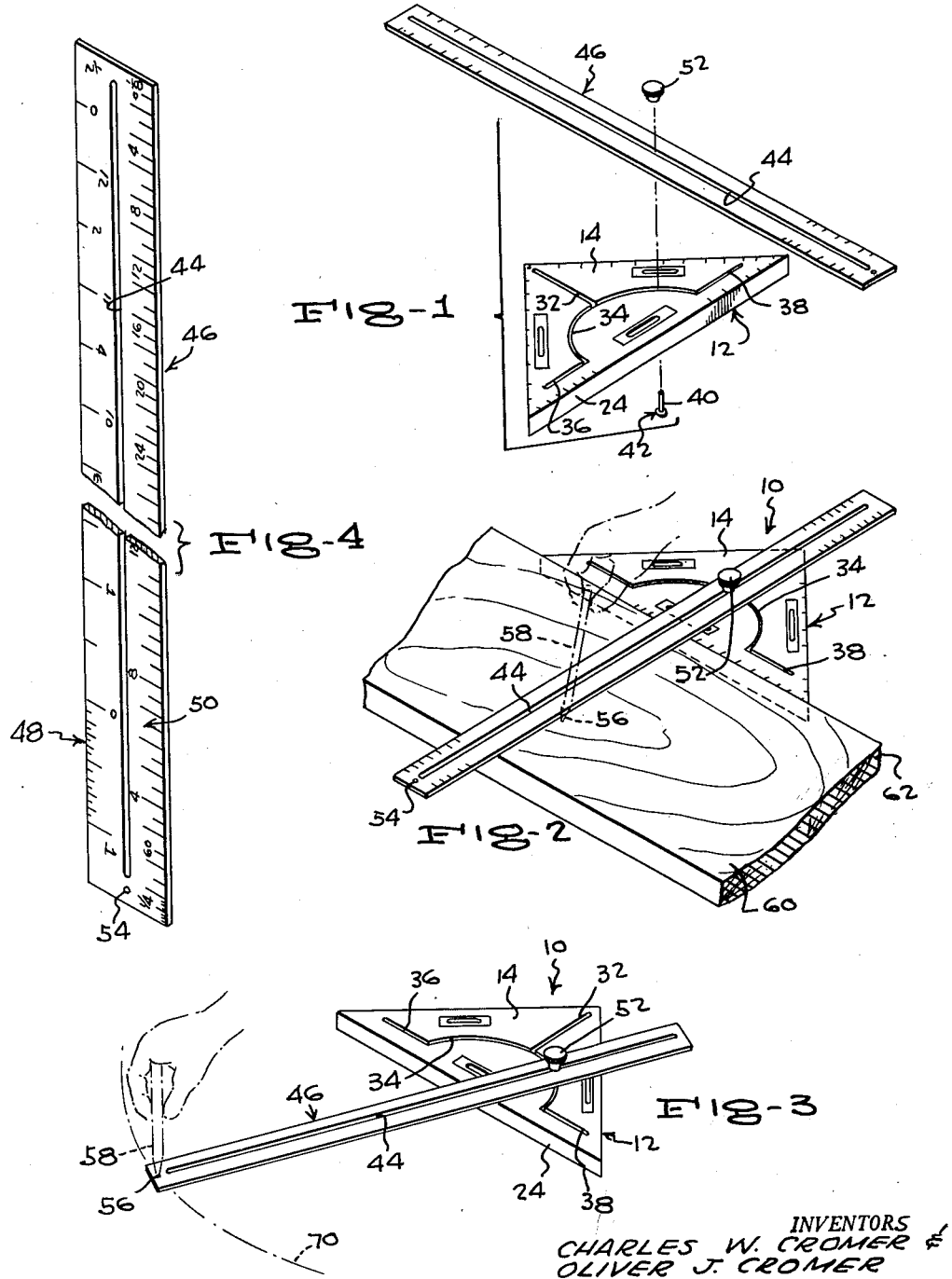
INVENTORS
CHARLES W. CROMER &
OLIVER J. CROMER
BY
McMorrow, Berman & Davidson
ATTORNEYS

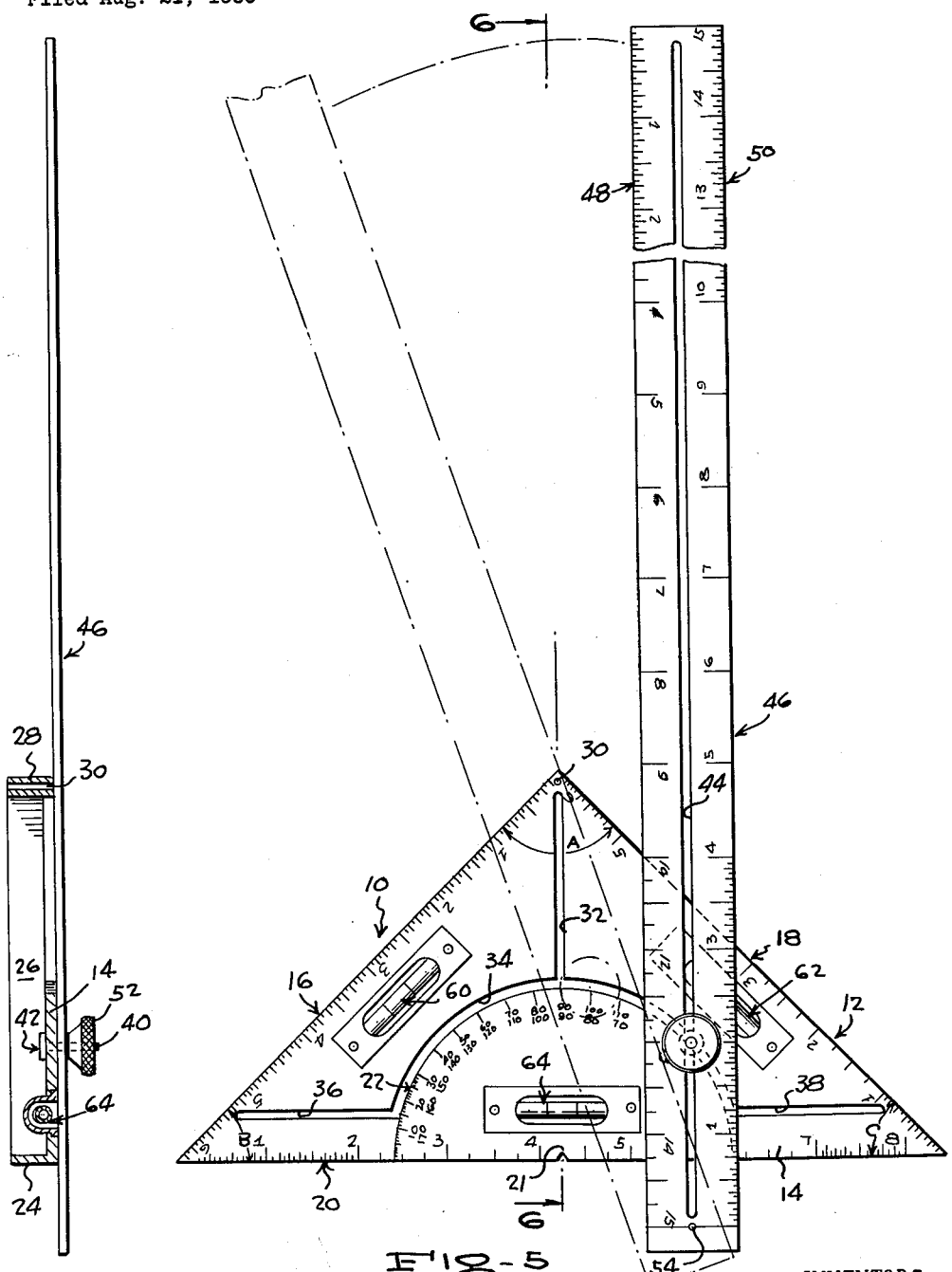

United States Patent Office 3,089,245
Patented May 14, 1963

3,089,245
COMBINATION TOOL
Charles W. Cromer, 303 Riverland Drive, and Oliver J. Cromer, 813 Illinois Ave., both of Salem, Va.
Filed Aug. 21, 1959, Ser. No. 835,349
1 Claim. (Cl. 33—27)

This invention relates to a combination tool or instrument for use in carpentry or as a drafting implement, and more especially, the present invention pertains to a combination tool having a plurality of uses.

One of the primary objects of this invention is to provide a compound two-piece tool or instrument comprising a base and a straight edge or ruler secured thereto for arcuate movement relative thereto from 0 degrees to 360 degrees.

This invention has, as still another object thereof, the provision of a tool of the type generally referred to above together with means for fixedly securing the straight edge or rule in a preselected adjusted position.

Another object of this invention is to provide a two-piece instrument including a base and a straight edge or ruler secured thereto wherein the ruler may be set at any desired angle relative to the sides of the base and wherein the ruler or straight edge may be also set parallel to any selected side of the base.

This invention contemplates, as a further object thereof, the provision of a compound tool as described above wherein the base and straight edge or ruler may be separated to serve a plurality of independent functions. For example, the ruler when separated from its normally associated base may be utilized as a standard rule or a scale rule. The base of this tool or instrument, when separated from its associated ruler may be used in six different manners, for example, (1) a miter, (2) a square, (3) a level, (4) a plumb, (5) a protractor, and (6) a rule.

It is still another object of this invention to provide a compound tool including a base member and a rule which, when used in conjunction with each other, has a plurality of functions among which the tool or rule serve as (1) bevel means, (2) a compass, (3) a depth gauge, (4) a height gauge, (5) a marking gauge, (6) a level, (7) miter means, (8) a standard rule, (9) a scale rule, (10) a scriber, (11) a T-square, (12) a try-square, (13) a square, (14) a plumb, and (15) a protractor.

Still another object of this invention is to provide a combined tool of the type generally described supra, the tool or instrument being non-complex in construction and assembly, inexpensive to manufacture, and durable in use.

Other and further objects and advantages of the instant invention will become more evident from a consideration of the following specification when read in conjunction with the annexed drawings, in which:

FIGURE 1 is an exploded perspective view of the instrument or tool constructed in accordance with this invention;

FIGURE 2 is a perspective view illustrating the instrument or tool shown in FIGURE 1 in association with a work piece and showing one application of the instrument;

FIGURE 3 is a perspective view illustrating the instrument utilized as means for inscribing an arc upon work not shown;

FIGURE 4 is a fragmentary perspective view of a straight edge or ruler bearing scaler indicia adjacent the marginal edges thereof;

FIGURE 5 is a top plan view of the assembled instrument and illustrating in phantom lines a pre-selected adjusted position of the straight edge relative to its base; and, FIGURE 6 is a detail cross-sectional view, partly in elevation, FIGURE 6 being taken substantially on the vertical plane of line 6—6 of FIGURE 5, looking in the direction of the arrows.

Referring now more specifically to the drawings, reference numeral 10 designates, in general, an instrument or tool constructed in accordance with the teachings of this invention. The instrument 10 is seen to comprise an isosceles triangular base 12 having a 90 degree corner A, and two 45 degree corners designated at B and C.

The base 12 includes a top plate 14 along the marginal longitudinal edges of which are inscribed or otherwise applied scaler indicia 16, 18 and 20. The top plate 14 also has inscribed thereon a protractor scale 22 having its opposed ends intersecting the scale 20 intermediate its opposed ends.

From the longitudinally extending marginal edges of the plate 14 depend a base flange 24 and a pair of depending side flanges 26 (only one being shown), the latter converging from the opposed ends of the base flange 24 to merge at the apex 28 of the instrument defined by the angle A. The side walls 26 at their point of merger are drilled to provide a transversely extending passage 30 to receive therein a scribing implement such as, for example, the lead of a pencil or a stylus of any desired type.

The top plate 14 is formed with an elongated substantially rectangular slot 32 which has its inner end immediately adjacent the passage 30 and its longitudinal axis bisecting the angle A and being disposed perpendicular to the base flange 24 and the marginal edge bearing the indicia 20. The longitudinal axis of the slot 32 also passes through the 90 degree mark on the protractor scale 22. The inner end of the slot 32 opens into and is in open communication with an arcuate transversely extending slot 34 centrally of the ends thereof, and the ends of the slot are in open communication with the inner ends, respectively, of a pair of horizontally extending slots 36, 38 which are disposed parallel to the base flange 24 and the longitudinally extending marginal edge of the top plate 14 bearing the indicia 20.

The slots 32, 34, 36 and 38 are adapted to slidably and adjustably receive therein the shank 40 of a headed screw 42, the shank 40 being of such length as to be slidably received within an elongated substantially rectangular slot 44 centrally positioned in a straight edge or ruler 46 having inverted and reversed scaler indicia 48, 50 or any desired indicia extending adjacent the longitudinally extending marginal edges thereof. The straight edge 46 is held in a selected adjusted position by means of the knurled knob 52. One or both of the ends of the straight edge 46 may be formed with an aperture 54 to receive therethrough a pencil point 56 (see FIGURE 3) of a pencil 58, or any other desired scribing instrument.

Inset into and depending from the top plate 14 are three spirit levels 60, 62 and 64 whose longitudinal axes are parallel, respectively, to the three sides of the top plate 14.

FIGURE 2 of the drawings illustrates another application of this invention in which the slot 44 is placed in registry with the slot 32 whereby each longitudinally extending edge of the straight edge 46 is perpendicular to the marginal edge bearing the indicia 20. This places the sides or edges of the straight edge perpendicular to the flange 24 whereby extension of the straight edge 46 permits the user to draw across a work piece having longitudinally extending side edges disposed in laterally spaced and parallel relation a line perpendicular thereto.

FIGURE 5 illustrates another position of the straight edge 46 relative to the base 12 wherein, again, the longitudinally extending sides or edges of the straight edge 46 are disposed perpendicular to the edge of the base bearing the indicia 20. In phantom lines the straight edge 46 is illustrated in a different position wherein the screw 42 has been moved upwardly in the arcuate groove 34 and the straight edge inclined at an angle other than 90 degrees relative to that longitudinally extending marginal edge of the device 10 which bears the indicia 20.

As will be recognized by those skilled in this art, the shank 40 of the screw 42 may be moved downwardly to slidably engage within either of the slots 36, 38 or upwardly in the slot 32. Additionally, the straight edge 46 may be adjusted relative to any of the sides of the base by sliding the shank 40 of the screw 42 towards either of the ends of the straight edge 46.

The provision of the spirit levels 60, 62 and 64 provide the user with means for instantaneously determining the level of any work piece engaged by any one of the flanges of the base 12.

One of the uses of the tool 10 is illustrated in FIGURE 2 of the drawings. It will be seen therein that the shank 40 has been moved to be centered over the 90 degree mark on the protractor scale 22, and the longitudinal axis of the elongated slot 44 formed in the straight edge or ruler 46 is aligned with the 90 degree mark, the arrow indicated at 21 included in the scaler indicia 20. The longitudinal axis of the slot 44 also extends diametrically across the passage 30. The knurled knob is now tightened thereby adjustably securing the straight edge or ruler 46 with the longitudinally extending sides thereof disposed perpendicular to the base flange 24. In this position, and assuming that it is desired to cut, or otherwise sever the work piece 60, along the line perpendicular to the edge 62 thereof, the base flange 24 is engaged against the edge 62 and at a preselected point on the work piece 60, the straight edge or ruler 46 is extended transversely thereacross. A line is now drawn along one of the longitudinally extending sides of the straight edge or ruler 46 to serve as guide means for the mechanic in carrying out the severing operation.

FIGURES 3 and 4 illustrate a still further use of the tool 10 wherein the shank 40 of the screw 42 is moved to the position shown in FIGURE 3 within the slot 34. The knob 52 is lightly tightened against the straight edge or ruler 46 to permit the same to turn about the screw 40 as a pivot point. Under these conditions, the user of the tool 10 inserts a scribing device within the passage 30 and by pivoting the straight edge ruler 46 about the screw 40 an arc or circle 70 is inscribed on the work piece (not shown).

While but two uses of the tool 10 have been described in detail, the multiple uses referred to supra in this specification above may be easily determined by one skilled in this art. Other uses will suggest themselves as experience with this tool is increased.

Having described and illustrated one embodiment of this invention, it will be understood that the same is offered merely by way of example, and that the scope of the invention is to be limited only by the appended claim.

What is claimed is:

An instrument or tool comprising a substantially triangular base plate having a continuous work engaging peripheral flange projecting laterally from a side thereof and perpendicular with respect thereto, said base plate having scaler indicia on the opposed side thereof disposed adjacent each of its marginal edges, a spirit level fixedly secured to said base plate proximate each edge thereof, each of said levels having a longitudinal axis substantially parallel with respect to its immediately adjacent base plate edge, said base plate having an arcuate slot extending transversely therethrough with the opposed ends thereof terminating adjacent one of said sides, protractor indicia disposed on said opposed side of said base plate adjacent a marginal edge of said arcuate slot, said base plate having an elongated substantially rectangular slot formed therein having its longitudinal axis perpendicular to one of said edges and bisecting the corner formed at the common junction of the other two edges of said base plate, said rectangular slot being in open communication at one of its ends with said arcuate slot, said arcuate slot terminating at each of its respective ends in the inner ends, respectively, of a pair of elongated slots, said pair of slots having longitudinally-extending axes disposed parallel to said one edge, an elongated substantially rectangular straight edge having a centrally located longitudinally extending substantially rectangular slot extending transversely therethrough, a screw having an enlarged head at one end of the shank thereof, said head being of such size as to span said arcuate and said rectangular slot, said screw having its shank projecting through said slots formed in said straight edge and a selected one of said slots formed in said base plate in which said shank is slidable without disconnection from said base plate or said straight edge, a knob threaded on the other end of said shank to fixedly secure said straight edge in any adjusted position relative to said sides of said base when said knob is tightened against said straight edge, and to permit said straight edge to pivot about or move linearly with respect to said shank when said knob is loosened.

References Cited in the file of this patent

UNITED STATES PATENTS

| | | |
|---|---|---|
| 71,843 | Bennor | Dec. 10, 1867 |
| 223,727 | Halley | Jan. 20, 1880 |
| 419,615 | Stilwell | Jan. 14, 1890 |
| 642,888 | Van Vliet | Feb. 6, 1900 |
| 715,610 | Sampson | Dec. 9, 1902 |